(12) United States Patent
Raut et al.

(10) Patent No.: US 12,466,941 B2
(45) Date of Patent: Nov. 11, 2025

(54) COMPOSITES FOR REDUCING NOISE

(71) Applicant: IMERYS USA, INC., Roswell, GA (US)

(72) Inventors: Prasad Raut, San Jose, CA (US); Maziyar Bolourchi, Los Gatos, CA (US)

(73) Assignee: Imerys USA, Inc., Roswell, GA (US)

( * ) Notice: Subject to any disclaimer, the term of this patent is extended or adjusted under 35 U.S.C. 154(b) by 0 days.

(21) Appl. No.: 17/047,140

(22) PCT Filed: Apr. 11, 2019

(86) PCT No.: PCT/US2019/026863
§ 371 (c)(1),
(2) Date: Oct. 13, 2020

(87) PCT Pub. No.: WO2019/200023
PCT Pub. Date: Oct. 17, 2019

(65) Prior Publication Data
US 2021/0163727 A1    Jun. 3, 2021

Related U.S. Application Data

(60) Provisional application No. 62/657,226, filed on Apr. 13, 2018.

(51) Int. Cl.
*C08L 23/12* (2006.01)
*C08K 3/36* (2006.01)
*C08F 10/06* (2006.01)

(52) U.S. Cl.
CPC ............... *C08L 23/12* (2013.01); *C08K 3/36* (2013.01); *C08F 10/06* (2013.01);
(Continued)

(58) Field of Classification Search
CPC ...... C08L 23/12; C08L 23/13; C08L 2207/04; C08K 3/36; C08K 2201/003; C08K 2201/006; C08F 10/06
(Continued)

(56) References Cited

U.S. PATENT DOCUMENTS 5,056,341 A    10/1991  Mori et al.
6,596,389 B1    7/2003  Hallett et al.
(Continued)

FOREIGN PATENT DOCUMENTS

CN    102977430    3/2013
CN    103897262 A    7/2014
(Continued)

OTHER PUBLICATIONS

English Machine Translation CN 104558840 A obtained at: http://translationportal.epo.org/emtp/translate/?ACTION=claims-retrieval&COUNTRY=CN&ENGINE=google&FORMAT=docdb&KIND=A&LOCALE=en_EP&NUMBER=104558840&OPS=ops.epo.org/3.2&SRCLANG=zh&TRGLANG=en (Year: 2015).*
(Continued)

*Primary Examiner* — Marc S Zimmer
*Assistant Examiner* — Ronald Grinsted
(74) *Attorney, Agent, or Firm* — Finnegan, Henderson, Farabow, Garrett & Dunner, LLP

(57) ABSTRACT

The present invention is directed to the use of a thermoplastic polymer-wollastonite composite and/or a thermoplastic elastomer-wollastonite composite for reducing noise. The present invention is also directed to an article comprising a thermoplastic polymer-wollastonite composite and/or a thermoplastic elastomer-wollastonite composite, a method of making an article according to the invention, and a device comprising an article according to the invention.

19 Claims, 2 Drawing Sheets

Sound transmission loss test

(52) U.S. Cl.
CPC .. *C08K 2201/003* (2013.01); *C08K 2201/006* (2013.01); *C08L 2207/04* (2013.01)

(58) Field of Classification Search
USPC ........................................................ 524/442
See application file for complete search history.

(56) References Cited

U.S. PATENT DOCUMENTS

| | | | |
|---|---|---|---|
| 8,904,642 B2 | 12/2014 | Hanna et al. | |
| 2004/0062898 A1* | 4/2004 | Felegi, Jr. | C09D 7/69 428/44 |
| 2009/0142585 A1* | 6/2009 | Kobayashi | C08L 77/06 977/773 |
| 2018/0001810 A1 | 1/2018 | Hwang et al. | |

FOREIGN PATENT DOCUMENTS

| | | | | |
|---|---|---|---|---|
| CN | 104479196 A | * | 4/2015 | .......... C08L 23/0853 |
| CN | 104558840 A | * | 4/2015 | ............. B29C 48/92 |
| CN | 105237850 A | | 1/2016 | |
| EP | 2101315 B1 | | 10/2009 | |
| IN | 201641005285 | | 4/2016 | |
| JP | H09-194743 A | | 7/1997 | |
| JP | 2000-129036 A | | 5/2000 | |
| JP | 2016-108229 A | | 6/2016 | |
| WO | WO-2017119949 A1 | * | 7/2017 | .............. C08J 3/005 |

OTHER PUBLICATIONS

English Machine Translation CN 104479196 A obtained at https://worldwide.espacenet.com/ (Year: 2015).*
NYAD 5000 Wollastonite (Year: 1999).*
NYAD M400 Wollastonite (Year: 1999).*
International Search Report and Written Opinion dated Jul. 1, 2019, in International Application No. PCT/US2019/026863.

* cited by examiner

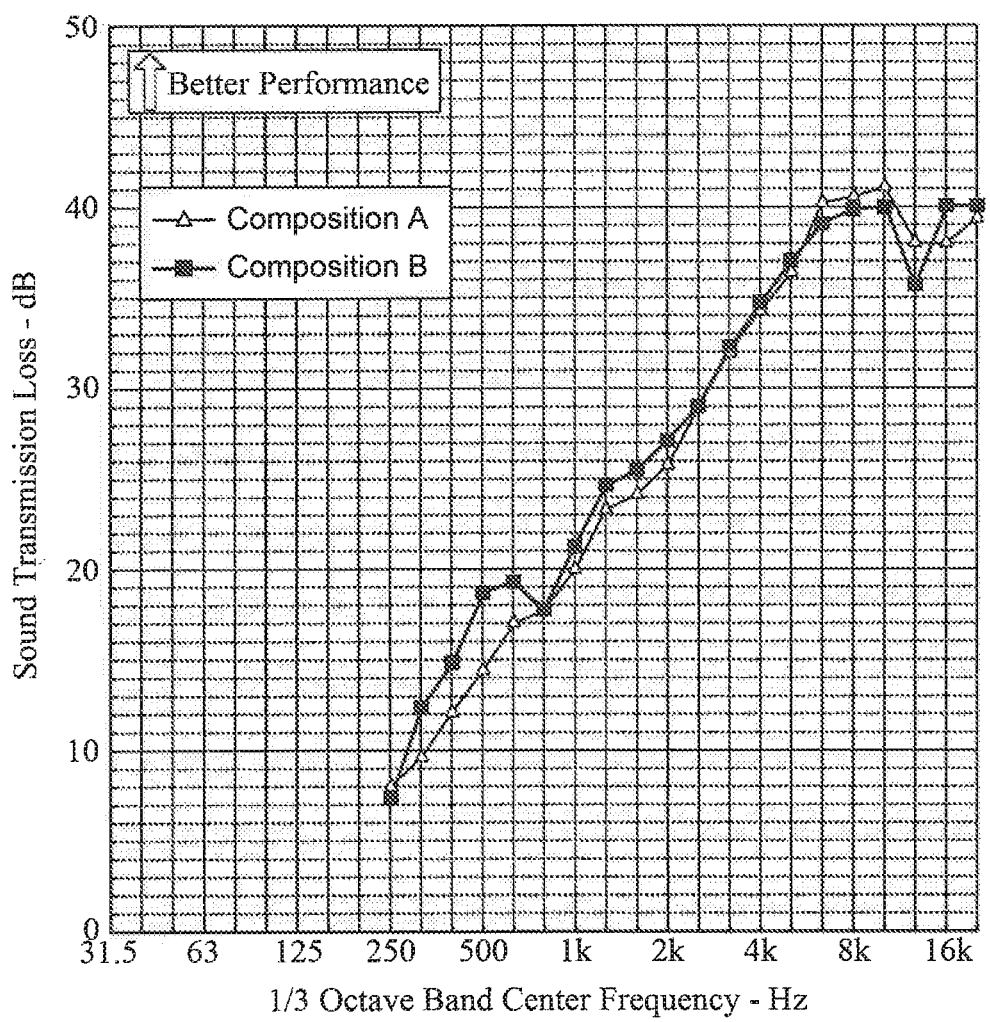
Figure 1: Sound transmission loss test

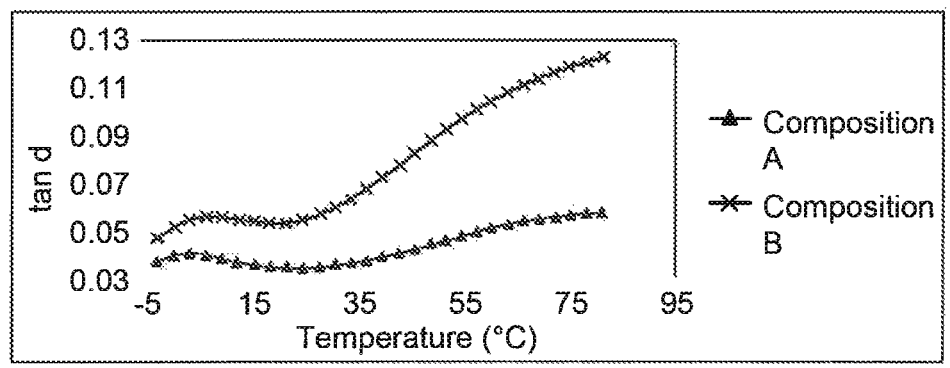
Figure 2: DMA curves in three point bending mode at 10 Hz frequency
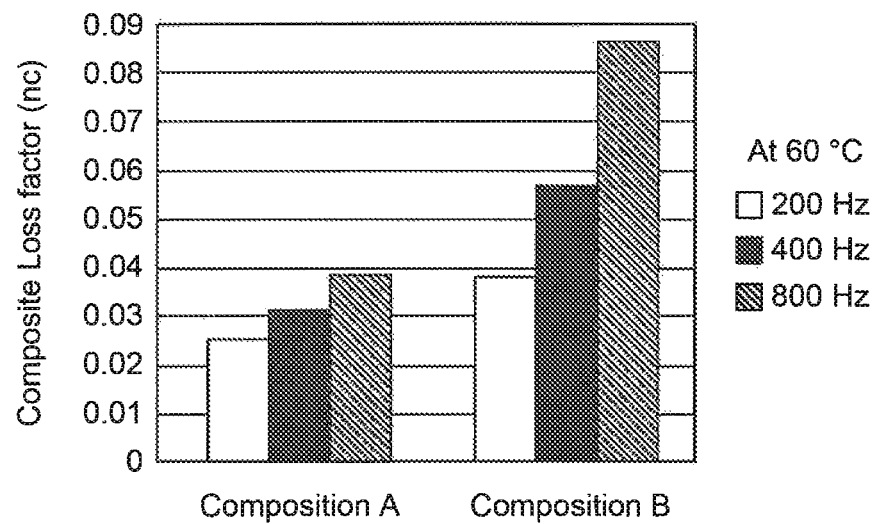
Figure 3: Centerpoint Test: Loss factor at 60 °C at 200, 400 and 800 Hz

COMPOSITES FOR REDUCING NOISE

CLAIM FOR PRIORITY

This application is a U.S. national phase entry under 35 U.S.C. § 371 from PCT International Application No. PCT/US2019/026863, filed Apr. 11, 2019, which claims the benefit of priority of U.S. Provisional Application No. 62/657,226, filed Apr. 13, 2018, from both of which this application claims priority and both of which are incorporated herein by reference.

FIELD OF THE INVENTION

The present invention relates generally to the use of a thermoplastic polymer-wollastonite composite and/or a thermoplastic elastomer-wollastonite composite for reducing noise. The present invention further relates to an article comprising a thermoplastic polymer-wollastonite and/or a thermoplastic elastomer-wollastonite composite, a method of making an article according to the invention, and a device comprising an article according to the invention.

BACKGROUND OF THE INVENTION

Many electrical devices emit sound; including household devices such as washing machines, tumble dryers, vacuum cleaners and air conditioning units. Exposure to loud and/or prolonged noise may be harmful to hearing, disrupt sleep and/or cause stress. There remains the need to find materials that will dampen the noise emitted by such devices or shield this noise from the human ear. The noise reduction of devices is particularly relevant with the increasing trend of open living spaces.

There are a number of challenges when developing materials to be used for noise reduction. Such materials are required to fulfil a range of requirements. In particular, a suitable material may be required to reduce noise over different frequencies and temperatures, whilst having the correct physical properties to be compatible with the noise producing device. It is desirable to provide alternative or improved materials for reducing noise that meet one or more of these requirements.

SUMMARY OF THE INVENTION

The present invention is defined in the appended claims.

In accordance with a first aspect, there is provided a use of a thermoplastic polymer-wollastonite composite and/or a thermoplastic elastomer-wollastonite composite for reducing noise.

In accordance with a second aspect, there is provided a thermoplastic polymer-wollastonite composite and/or a thermoplastic elastomer-wollastonite for use as a noise-reducing material.

In accordance with a third aspect, there is provided an article comprising a thermoplastic polymer-wollastonite composite and/or a thermoplastic elastomer-wollastonite according the second aspect.

In accordance with the fourth aspect there is provided a method of manufacturing the article according to the third aspect by extrusion, injection molding and/or thermoforming.

In accordance with a fifth aspect there is provided a method of reducing noise comprising the use according to the first aspect.

In accordance with a sixth aspect there is provided a device comprising an article according to the third aspect.

Certain embodiments of the present invention may provide one or more of the following advantages:

- desired noise reduction;
- desired noise blocking;
- desired mechanical properties;
- desired thermal properties;
- desired rheological properties;
- desired density;
- desired mold shrinkage
- desired cost.

The details, examples and preferences provided in relation to any particular one or more of the stated aspects of the present invention apply equally to all aspects of the present invention. Any combination of the embodiments, examples and preferences described herein in all possible variations thereof is encompassed by the present invention unless otherwise indicated herein, or otherwise clearly contradicted by context.

BRIEF DESCRIPTION OF THE DRAWINGS

The invention will further be illustrated by reference to the following figures:

FIG. 1 depicts the sound transmission loss results for Composition A and Composition B;

FIG. 2 depicts the tan d results for Composition A and Composition B;

FIG. 3 depicts the composite loss factor results for Composition A and Composition B.

It is understood that the following description and references to the figures concern exemplary embodiments of the present invention and shall not be limiting the scope of the claims.

DETAILED DESCRIPTION

The present invention is based on the surprising finding that thermoplastic polymer-wollastonite composites and/or thermoplastic elastomer-wollastonite composites are effective as noise-reducing agents. Wollastonite is an industrial mineral comprised chemically of calcium, silicon and oxygen. Its molecular formula is $CaSiO_3$ and its theoretical composition consists of 48.28% CaO and 51.72% $SiO_2$. Natural wollastonite may contain trace or minor amounts of various metal ions such as aluminum, iron, magnesium, potassium and sodium.

The wollastonite disclosed herein have a particle size. Particle size may be measured by any appropriate measurement technique now known to the skilled artisan or hereafter discovered. Unless otherwise stated, particle size and particle size properties, such as particle size distribution ("psd"), are measured using a Leeds and Northrup Microtrac X100 laser particle size analyzer (Leeds and Northrup, North Wales, Pennsylvania, USA), which can determine particle size distribution over a particle size range from 0.12 μm to 704 μm. The size of a given particle is expressed in terms of the diameter of a sphere of equivalent diameter that sediments through the suspension, also known as an equivalent spherical diameter or "esd." The median particle size, or $d_{50}$ value, is the value at which 50% by weight of the particles have an esd less than that $d_{50}$ value. The $d_{10}$ value is the value at which 10% by weight of the particles have an esd less than that $d_{10}$ value. The $d_{90}$ value is the value at which 90% by weight of the particles have an esd less than that $d_{90}$ value.

In certain embodiments wollastonite has a mean particle size $d_{50}$ of about 1 µm to about 90 µm, or about 3 µm to about 85 µm, or about 5 µm to about 80 µm, or about 8 µm to about 75 µm, or about 10 µm to about 70 µm, or about 12 µm to about 65 µm, or about 15 µm to about 60 µm, or about 17 µm to about 55 µm, or about 20 µm to about 50 µm, or about 23 µm to about 45 µm, or about 25 µm to about 40 µm, or about 30 µm to about 35 µm.

The morphology of the wollastonite, according to some embodiments, may be characterized by aspect ratio. The aspect ratio of a particulate refers generally to a ratio of the length-to-width of the particulate. For a given particulate sample, the aspect ratio may be determined as an average. For example, the aspect ratio of the wollastonite particulate according to some embodiments may be determined by first depositing a slurry including a sample of the wollastonite particulate on a standard SEM stage and coating the dried slurry with platinum. Images of the particulate may thereafter be obtained, and the particle dimensions may be determined, for example, using a computer-based analysis, in which it is assumed that the thickness and width of the particles are equal. The aspect ratio may then be determined by averaging a number of calculations (e.g., fifty calculations) of individual particle length-to-width aspect ratios. Other methods of determining aspect ratios are contemplated.

In certain embodiments, the wollastonite particulate may have an aspect ratio of at least 2:1. For example, the wollastonite particulate may have an aspect ratio of at least 3:1, an aspect ratio of at least 4:1, an aspect ratio of at least 7:1, an aspect ratio of at least 12:1, an aspect ratio of at least 15:1, or an aspect ratio of at least 20:1.

In certain embodiments of the method, the wollastonite particulate may have a median plate thickness of less than or equal to about 2 µm, such as, for example, less than or equal to about 1 µm. According to some embodiments, the wollastonite may have a median plate thickness ranging from about 3 to about 70 µm, or from about 4 to about 60 µm, or from about 5 to about 50 µm, or from about 6 to about 40 µm, or from about 7 to about 30 µm, or from about 8 to about 20 µm, or from about 9 to about 15 µm. The median plate thickness may be measures using a Leeds and Northrup Microtrac X100 laser particle size analyzer (Leeds and Northrup, North Wales, Pennsylvania, USA).

The surface area of the mineral is measured using the BET method by quantity of nitrogen adsorbed on the surface of said particles so as to form a monomolecular layer completely covering said surface (measurement according to the BET method, AFNOR standard X11-621 and 622 or ISO 9277).

In certain embodiments, the BET surface area is in the range of about 0.2 to about 5.0 m$^2$/g, or about 0.4 to about 4.8 m$^2$/g, or about 0.6 to about 4.6 m$^2$/g, or about 0.8 to about 4.4 m$^2$/g, or about 0.6 to about 4.2 m$^2$/g, or about 1.0 to about 4.0 m$^2$/g, or about 1.2 to about 3.8 m$^2$/g, or about 1.4 to about 3.6 m$^2$/g, or about 1.6 to about 3.0 m$^2$/g, or about 1.7 to about 2.7 m$^2$/g, or about 1.8 to about 2.5 m$^2$/g, or about 1.9 to about 2.2 m$^2$/g.

A thermoplastic polymer according to the present invention is a type of plastic that changes its properties when heated and cooled. A thermoplastic polymer may be made up of long, unlinked polymer molecules and generally have a high molecular weight. They soften and melt when heated, while they set when cooled. This characteristic allows thermoplastics to be remolded and recycled without negatively affecting the material's physical properties.

As used in this specification and appended claims, the singular forms "a", "and" and "the" include plural referents unless the context clearly dictates otherwise. For example, "a thermoplastic polymer", "the thermoplastic polymer" and "thermoplastic polymer" may refer to a polymer comprising more than one thermoplastic polymers. Likewise, "a thermoplastic elastomer", "the thermoplastic elastomer" and "thermoplastic elastomer" may refer to a polymer comprising more than one thermoplastic elastomers.

Examples of thermoplastic polymers include, but are not limited to, polypropylene, polyethylene, polystyrene, polyvinyl chloride, acrylic, polyimide, polycarbonate, poly(methyl methacrylate), acrylonitrile butadiene styrene, thermoplastic starch and combinations thereof. In certain embodiments the thermoplastic polymers may be selected from polypropylene, polyamide, polycarbonate or combinations thereof. In certain embodiments, the thermoplastic polymer according to the present invention is a recycled thermoplastic polymer, for example polyethylene or polypropylene recycled polymers. In certain embodiments, the thermoplastic polymer according to the present invention is partly a recycled thermoplastic polymer.

Thermoplastic elastomers exhibit both thermoplastic and elastomeric properties. Thermoplastic elastomers may be selected from thermoplastic polyurethane, thermoplastic vulcanizates, thermoplastic olefin, thermoplastic polyamides, thermoplastic styrenics, thermoplastic copolyester and combinations thereof. In certain embodiments, the thermoplastic elastomer according to the present invention is a recycled thermoplastic elastomer. In certain embodiments, the thermoplastic elastomer according to the present invention is partly a recycled thermoplastic elastomer.

Thermosetting polymers, including thermosetting elastomers retain shape and strength when heated. Thermosetting polymers may be selected from epoxy resins, polyesters, phenol formaldehydes, urea formaldehydes, melamine formaldehydes, polyimides, polyisocyanurate, vinyl esters. Thermosetting elastomers may be selected from styrene-butadiene rubber, nitrile rubbers, butyl rubber, polybutadiene, polyisoprene, ethylene propylene or ethylene propylene diene (EPDM), silicone or combinations thereof.

In certain embodiments, the thermoplastic polymers and/or thermoplastic elastomers comprise no more than 50 weight percent of thermosetting polymers and/or thermosetting elastomers, or no more than 40 weight percent of thermosetting polymers and/or thermosetting elastomers, or no more than 30 weight percent of thermosetting polymers and/or thermosetting elastomers, or no more than 20 weight percent of thermosetting polymers and/or thermosetting elastomers, or no more than 10 weight percent of thermosetting polymers and/or thermosetting elastomers, based on the total weight of the thermoplastic polymers and/or thermoplastic elastomers. In certain embodiments, the thermoplastic polymers and/or thermoplastic elastomers are free from thermosetting polymers and/or thermosetting elastomers.

The thermoplastic polymer-wollastonite composite according to the present invention is a composite material comprising a thermoplastic polymer and wollastonite. The thermoplastic elastomer-wollastonite composite according to the present invention is a composite material comprising a thermoplastic elastomer and wollastonite.

Thermoplastic foams are manufactured by inflating thermoplastic polymers with one or more gas(es). In this way, polymers can be expanded from 1.5 to 50 fold, resulting in foamed products with a low density of, for example, from 15 kg/m$^3$ to 750 kg/m$^3$. Thermoplastic foams may be made of polyethylene, polypropylene, polystyrene, polyvinylchloride, polycarbonate, poly(methylmethacrylate), poly(ethylene terephthalate) or ethylene vinyl acetate. In certain embodiments the thermoplastic polymers and thermoplastic elastomers according to the invention are not treated with one or more gas(es) to form a foam. In certain embodiments of the present invention, the composites are essentially free from thermoplastic foams, which in certain examples means that thermoplastic foams are present in an amount of less than 0.1 weight percent, or less than 0.5 weight percent, or less than 1.0 weight percent, or less than 1.5 weight percent, or less than 2.0 weight percent, or less than 2.5 weight percent in the thermoplastic polymer-wollastonite composite and/or thermoplastic elastomer-wollastonite composite, based on the total weight of the composite.

In certain embodiments the thermoplastic polymer-wollastonite composite or the thermoplastic elastomer-wollastonite composite comprises wollastonite in an amount of from about 5 to about 50 weight percent, or from about 10 to about 45 weight percent, or from about 15 to about 40 weight percent, or from about 20 to about 35 weight percent, or from about 25 to about 30 weight percent, based on the total weight of the composite.

In certain embodiments the thermoplastic polymer-wollastonite composite comprises a thermoplastic polymer in an amount of from about 40 to about 95 weight percent, or from about 45 to about 90 weight percent, or from about 50 to about 85 weight percent, or from about 55 to about 80 weight percent, or from about 60 to about 75 weight percent, or from about 65 to about 70 weight percent, based on the total weight of the composite.

In certain embodiments the thermoplastic elastomer-wollastonite composite comprises a thermoplastic elastomer in an amount of from about 40 to about 95 weight percent, or from about 45 to about 90 weight percent, or from about 50 to about 85 weight percent, or from about 55 to about 80 weight percent, or from about 60 to about 75 weight percent, or from about 65 to about 70 weight percent, based on the total weight of the composite.

In certain embodiments a combination of a thermoplastic polymer-wollastonite composite and a thermoplastic elastomer-wollastonite composite comprises a thermoplastic polymer and a thermoplastic elastomer in an amount of from about 40 to about 95 weight percent, or from about 45 to about 90 weight percent, or from about 50 to about 85 weight percent, or from about 55 to about 80 weight percent, or from about 60 to about 75 weight percent, or from about 65 to about 70 weight percent, based on the total weight of the composite.

In certain embodiments, the thermoplastic polymer-wollastonite composite and/or the thermoplastic elastomer-wollastonite composite further comprises one or more components, such as plastic additives, selected from a plasticizer, a stabilizer, an impact modifier, a filler/extender, a flame retardant, a tackifier, a thickener/rheology modifier, an antioxidant, a compatibilizer, an accelerator agent and combinations thereof. The plastic additives may also be selected from the non-limiting list including anti-foaming agents, anti-scratch agents, biocides, blowing agents and others plastics additives listed, for example, in the Plastic Additives Handbook 6th Edition (2009), Zweifel, H., Maier, R., Schiller, M., Hanser Publications or found under www.polymer-additives.specialchem.com/selectors.

The plastic additive may be selected from: compatibilizers, such as maleic unhydride grafted polypropylene: POLYBOND®, Lotryl®, Epolene®, Fusabond®; rheology modifiers, such as blends of fatty acid derivatives: Strucktol® (e.g. Strucktol® RP-11), Quent® (e.g. Quent® TPP), Peroxan TPO, TEGOMER® (e.g. TEGOMER® P 122), Luperox® (e.g. Luperox® 101PP7.5); antioxidants, such as ANOX® (e.g. ANOX® BB011), NAUGARD® (e.g. NAUGARD® P), ULTRANOX® (e.g. ULTRANOX® 626), Irgafos® (e.g. Irgafos® 168), Irganox® (e.g. Irganox® 1010).

Noise reduction is perceived by human ear when the intensity of sound wave, such as within the frequency range of 20 Hz to 20000 Hz, is reduced. Any level of reduction in sound or vibration within this frequency range is desired. For a dishwasher, for example, the sound frequency is within 200-800 Hz.

Noise reduction may be defined, for example, as the reduction in intensity/pressure of sound. In certain examples, the reduction in sound intensity/pressure may be achieved by absorption and/or barrier treatment. In absorption treatment, such as the use of foam, internal reflection of sound waves allow conversion of sound energy to heat. In barrier treatment waves are reflected from the surface due to high surface density of material.

Noise reduction may be defined as the reduction in vibration. In certain examples, the reduction in vibration may be achieved by damping and/or isolation. In damping mode, vibration energy is absorbed by material and converted to heat or other forms of energy. Isolation treatment simply isolates the vibration creating device/part from rest of the device and prevents the vibrations to be transferred to other parts.

In certain embodiments, an article according to the present invention comprises a thermoplastic polymer-wollastonite composite and/or a thermoplastic elastomer-wollastonite composite. Such an article may be manufactured using extrusion, injection molding and/or thermoforming. In certain embodiments the article may be a panel, which may be used as an enclosure, an acoustic partition and/or a hanging baffle.

An article, such as a panel, may be used to encase a device according to the invention. The device may produce a noise. The device may be selected from an air conditioning unit, a washing machine, a tumble dryer, a washing machine/tumble dryer, a fridge, a freezer, a dishwasher, a grinder, a vacuum cleaner, a hairdryer, a pump, a compressor, a generator, a lawn mower, an automobile, construction equipment, garden appliances or agriculture equipment.

In certain embodiments, a thermoplastic polymer-wollastonite composite and/or articles comprising the thermoplastic polymer-wollastonite composite one or more of the following effects:
  a reduction of noise;
  a reduction of noise at one or more frequencies;
  a reduction of sound at one or more frequencies;
  a reduction of vibration at one or more frequencies;
  suitable tensile strength;
  suitable thermal resistance;
  suitable Izod impact;
  suitable stiffness;
  suitable part density and mold shrinkage;
  suitable melt flow rate of compound.

For the avoidance of doubt, the present application is directed to subject-matter described in the following numbered paragraphs.
  1. Use of a thermoplastic polymer-wollastonite composite and/or a thermoplastic elastomer-wollastonite composite for reducing noise.

2. The use according to numbered paragraph 1, wherein the wollastonite has a median particle size $d_{50}$ in the range of from about 1 µm to about 90 µm.
3. The use according to numbered paragraph 1 or numbered paragraph 2, wherein the wollastonite particulate has an aspect ratio of at least 2:1
4. The use according to any one of the preceding numbered paragraphs, wherein the wollastonite has a BET surface area in the range of from about 0.2 to about 5.0 $m^2/g$.
5. The use according to any one of the preceding numbered paragraphs, wherein wollastonite is present in an amount of from about 5 to about 50 weight percent based on the total weight of the composite.
6. The use according to any one of the preceding numbered paragraphs, wherein the thermoplastic polymer is selected from polypropylene, polyethylene, polystyrene, polyvinyl chloride, acrylic, polyamides, polycarbonate, poly(methyl methacrylate), acrylonitrile butadiene styrene, thermoplastic starch or combinations thereof.
7. The use according to any one of the preceding numbered paragraphs, wherein the thermoplastic elastomer is selected from thermoplastic polyurethane, thermoplastic vulcanizates, thermoplastic olefin thermoplastic polyamides, thermoplastic styrenics, thermoplastic copolyester or combinations thereof.
8. The use according to any one of the preceding numbered paragraphs, wherein the thermoplastic polymer and/or the thermoplastic elastomer is present in an amount of from about 40 to about 95 weight percent based on the total weight of the composite.
9. The use according to any one of the preceding numbered paragraphs, wherein the composite further comprises one or more component selected from a plasticizer, a stabilizer, an impact modifier, a filler/extender, a flame retardant, a tackifier, a thickener/rheology modifier, an antioxidant, a compatibilizer, an accelerator agent or combinations thereof.
10. The use according to any one of the preceding numbered paragraphs, wherein the composite is essentially free from thermoplastic foam.
11. The use according to numbered paragraph 10, wherein the composite comprises thermoplastic foam in an amount of less than 0.1 weight percent based on the total weight of the composite.
12. A thermoplastic polymer-wollastonite composite and/or a thermoplastic elastomer-wollastonite composite for use as a noise-reducing material.
13. A thermoplastic polymer-wollastonite composite and/or a thermoplastic elastomer-wollastonite composite according to numbered paragraph 12, wherein the wollastonite has a median particle size $d_{50}$ in the range of from about 1 µm to about 90 µm.
14. A thermoplastic polymer-wollastonite composite and/or a thermoplastic elastomer-wollastonite composite according to numbered paragraph 12 or numbered paragraph 13, wherein the wollastonite particulate has an aspect ratio of at least 2:1
15. A thermoplastic polymer-wollastonite composite and/or a thermoplastic elastomer-wollastonite composite according to any one of the numbered paragraphs 12 to 14, wherein the wollastonite has a BET surface area in the range of from about 0.2 to about 5.0 $m^2/g$.
16. A thermoplastic polymer-wollastonite composite and/or a thermoplastic elastomer-wollastonite composite according to any one of the numbered paragraphs 12 to 15, wollastonite is present in an amount of from about 5 to about 50 weight percent based on the total weight of the composite.
17. A thermoplastic polymer-wollastonite composite and/or a thermoplastic elastomer-wollastonite composite according to any one of the numbered paragraphs 12 to 16, wherein the thermoplastic polymer is selected from polypropylene, polyethylene, polystyrene, polyvinyl chloride, acrylic, polyamides, polycarbonate, poly(methyl methacrylate), acrylonitrile butadiene styrene, thermoplastic starch or combinations thereof.
18. A thermoplastic polymer-wollastonite composite and/or a thermoplastic elastomer-wollastonite composite according to any one of the numbered paragraphs 12 to 17, wherein the thermoplastic elastomer is selected from thermoplastic polyurethane, thermoplastic vulcanizates, thermoplastic olefin thermoplastic polyamides, thermoplastic styrenics, thermoplastic copolyester or combinations thereof.
19. A thermoplastic polymer-wollastonite composite and/or a thermoplastic elastomer-wollastonite composite according to any one of the numbered paragraphs 12 to 18, wherein the thermoplastic polymer and/or the thermoplastic elastomer is present in an amount of from about 40 to about 95 weight percent based on the total weight of the composite.
20. A thermoplastic polymer-wollastonite composite and/or a thermoplastic elastomer-wollastonite composite according to any one of the numbered paragraphs 12 to 19, wherein the composite further comprises one or more component selected from a plasticizer, a stabilizer, an impact modifier, a filler/extender, a flame retardant, a tackifier, a thickener/rheology modifier, an antioxidant, a compatibilizer, an accelerator agent or combinations thereof.
21. A thermoplastic polymer-wollastonite composite and/or a thermoplastic elastomer-wollastonite composite according to any one of the numbered paragraphs 12 to 20, wherein the composite is essentially free from thermoplastic foam.
22. The use according to numbered paragraph 21, wherein the composite comprises thermoplastic foam in an amount of less than 0.1 weight percent based on the total weight of the composite.
23. An article comprising a thermoplastic polymer-wollastonite composite and/or a thermoplastic elastomer-wollastonite composite according to any one of the numbered paragraphs 12 to 22.
24. An article of numbered paragraph 23, wherein the article is a panel.
25. A method of manufacturing the article according to numbered paragraph 23 or numbered paragraph 24 by extrusion, injection molding and/or thermoforming.
26. A method of reducing noise comprising the use according to numbered paragraphs 1 to 11.
27. A device comprising an article according to numbered paragraph 23 or numbered paragraph 24.
28. The device according to numbered paragraph 27, wherein the device is an air conditioning unit, a washing machine, a tumble dryer, a washing machine/tumble dryer, a fridge, a freezer, a dishwasher, a grinder, a vacuum cleaner, a hairdryer, a pump, a compressor, a generator or a lawn mower.

EXAMPLES

Pellets of the composites A to D were obtained by compounding the ingredients shown in Table 1 using a twin screw extrusion process, using the conditions in Table 2.

TABLE 1

Composite formulations

| Ingredients | Purpose | Composition A | B | C | D |
|---|---|---|---|---|---|
| Polypropylene homopolymer INEOS PP-HP H13M00 | Resin | 64.5 | 64.5 | 54.65 | 54.65 |
| Addivant Polybond ® 3000 | Compatibilizer | 5.00 | 5.00 | 2.00 | 2.00 |
| STRUCKTOL ® RP 11 | Rheology modifier | 0.5 | 0.5 | 0.15 | 0.15 |
| Chopped Glass Fiber (TFEC 10 3/16 738) | Reinforcement | 30 | — | 40 | 20 |
| Anox BB011 | Stabilization package | — | — | 0.2 | 0.2 |
| Engage 8200 | Impact modifier | — | — | 3 | 3 |
| Wollastonite (Nyglos ® 12-10992) | Reinforcement | — | 30 | — | — |
| Wollastonite (Nyglos ® 8-10992) | Reinforcement | — | — | — | 20 |

TABLE 2

Twin Screw extrusion processing parameters

| Operating Parameters | Set | Actual |
|---|---|---|
| Zone 1 Temperature (° C.) | 25 | 27 |
| Zone 2 Temperature (° C.) | 210 | 210 |
| Zone 3 Temperature (° C.) | 210 | 210 |
| Zone 4 Temperature (° C.) | 210 | 210 |
| Zone 5 Temperature (° C.) | 210 | 210 |
| Zone 6 Temperature (° C.) | 210 | 210 |
| Zone 7 Temperature (° C.) | 210 | 210 |
| Zone 8 Temperature (° C.) | 210 | 210 |
| Zone 12 Adapter (° C.) | 210 | 210 |
| Zone 13 Die Temperature (° C.) | 210 | 210 |
| TM1 Melt Temperature (° C.) | | 217 |
| Screw RPM | | 350 |
| Side Feeder 1 RPM | | 300 |
| Side Feeder 2 RPM | | 300 |
| % Torque | | 13-23 |
| Die Pressure (psi) | | 35-125 |
| Specific Mechanical Energy (kwh/kg) | | 0.11-0.12 |
| Vent Location | | Closed |
| Throughput (kg/hr) | | 10 |

The pellets were used in an injection molding process using 66-ton Arburg Allrounder 370E 600-170 injection molder, to obtain the standard specimens for each of the ASTM tests provided below. All compounds were dried in convection over at 80° C. prior to injection molding. Table 3 shows the injection molding parameters used in this study. Injection pressure for the electric drive injection molder along with approximate equivalent hydraulic pressures are also shown in bracket.

TABLE 3

Injection molding parameters used (ASTM mold)
Drying Conditions:

| | |
|---|---|
| Temperature (° C.) | 80 |
| Time (hr) | 1 |
| Temperatures: | |
| Zone 1 - Nozzle (° F.) | 435 |
| Zone 2 (° F.) | 425 |
| Zone 3 (° F.) | 425 |
| Zone 4 (° F.) | 395 |
| Zone 5 (° F.) | 355 |
| Mold (° F.) | 130 |

TABLE 3-continued

Injection molding parameters used (ASTM mold)
Drying Conditions:

| Others: | |
|---|---|
| Screw RPM | 100 |
| Injection Velocity 1 (in/sec) | 2-2.25 |
| Cushion (in) | 0.17-0.19 |
| Shot Size (in), Avg | 2.65 |
| Screw Decompression, in | 0.5 |
| Plastic (Hydraulic) Injection Pressure, psi | 15000 (1050) |
| Plastic (Hydraulic) Holding Pressure, psi | 1500-5000 (105-350) |
| Plastic (Hydraulic) Back Pressure, psi | 800-1000 (55-70) |

The compression molded test specimens of dimension 10"×10" were used to test the sound transmission loss following SAE J1400 (August 2010) Injection molded specimens were used for measurement of tan d and composite loss factor.

tan d was measured using Dynamic mechanical analysis using TA Instruments RSA G2 equipped with a 40 mm 3-point bending fixture over the temperature range of 0 to 80° C. using a tensile strain of 0.05% at an angular frequency of 10 rad/s. Dimensions of the test specimens were approximately 12.6×3.1×54 mm.

The composite loss factor was measured using ISO 16940 (2008) at 23° C. and 60° C. using specimens of dimension 125 mm×12.5 mm (also referred to as the vibration damping/centerpoint test).

Results of the sound transmission loss tests, tan d test and composite loss factor test for compositions A and B may be seen in FIG. 1, FIG. 2 and FIG. 3, respectively. All three tests demonstrate a better performance for composition B (inventive example) over composition A (comparative example).

As seen in FIG. 1, composition B outperformed composition A in the sound transmission test, especially in the ⅓ octave band frequency of between 250 Hz to 4,000 Hz. FIG. 2 shows the damping performance of composition A and composition B as measured by the tan d. Composition B according to the invention once again outperforms the comparative example composition A, with a higher tan d at a range of temperatures. FIG. 3 shows composite loss factor for both composition A and composition B at a number of frequencies (200, 400 and 800 Hz). In each of these examples, composition B according to the invention outperformed comparative example, composition A.

In addition to the noise-reducing properties of composition B according to the invention, composition B was also found to have suitable mechanical properties for a range of applications, especially as panels for noise-producing devices.

The molded specimens prepared to carry out the test discussed above were also conditioned at 23° C. and 50% relative humidity for 7 days and tested for the following properties:

Ash content (internal method—using microwave ash oven)
Density measurement using Mettler Toledo MS semi-micro balance and density kit
Flexural properties using ASTM D790 (at 0.05 in/min speed)
Tensile properties using ASTM D638 (at 2 in/min speed)
Notched Izod Impact using ASTM D256 at 23° C.
Heat deflection temperature measured as per ASTM D648
Gloss measurement using Gardner micro-Tri-gloss meter
Mold shrinkage (flow and cross flow) using an in-house developed fixture In each of the test listed, compositions according to the invention were found to perform well. In certain test a marked improvement over compositions comprising neat resin was found, as shown below. In addition, the mechanical properties of the compositions according to the invention comply with the requirements of most household appliances.

Ash content (internal method—using microwave ash oven)—filler loadings were verified and found to be within acceptable range;

Density measurement using Mettler Toledo MS semi-micro balance and density kit—Measured density values were similar to theoretical density values for the target filler loading;

Flexural properties using ASTM D790 (at 0.05 in/min speed)—Composition B according to the invention provided about 200% improvement in flexural modulus over compositions comprising neat resin;

Notched Izod Impact using ASTM D256 at 23° C.—Composition B provided about 200% improvement in flexural modulus over compositions comprising neat resin.

Heat deflection temperature (HDT) measured as per ASTM D648 Composition B offered improved HDT over compositions comprising neat resin by 30° C.

The invention claimed is:

1. A noise-reducing composition comprising a thermoplastic elastomer-wollastonite composite, wherein
the thermoplastic elastomer is selected from thermoplastic polyurethane,
thermoplastic vulcanizates, thermoplastic polyamides, thermoplastic styrenics,
thermoplastic copolyester and combinations thereof;
and the thermoplastic elastomer-wollastonite composite comprises wollastonite in an amount of from about 30 to about 45 weight percent based on the total weight of the thermoplastic elastomer-wollastonite composite and having a BET surface area in the range of from about 0.2 to about 3.0 $m^2/g$.

2. A composition according to claim 1, wherein the wollastonite has a median particle size $d_{50}$ in the range of from about 1 μm to about 90 μm.

3. A composition according to claim 1, wherein the wollastonite has a BET surface area in the range of from about 0.4 to about 2.7 $m^2/g$.

4. A composition according to claim 1, wherein the thermoplastic elastomer is present in an amount of from about 40 to about 70 weight percent based on the total weight of the composite.

5. A composition according to claim 1, wherein the composite further comprises one or more component selected from a plasticizer, a stabilizer, an impact modifier, a filler/extender, a flame retardant, a tackifier, a thickener/rheology modifier, an antioxidant, a compatibilizer, an accelerator agent or combinations thereof.

6. An article comprising a composition according to claim 1.

7. An article according to claim 6, wherein the article is a panel.

8. A method of manufacturing the article according to claim 6 by extrusion, injection molding and/or thermoforming.

9. A method of reducing noise comprising installing an article comprising the composition of claim 1 within a device.

10. A device comprising an article according to claim 6.

11. The device according to claim 10, wherein the device is an air conditioning unit, a washing machine, a tumble dryer, a washing machine/tumble dryer, a refrigerator, a freezer, a dishwasher, a grinder, a vacuum cleaner, a hairdryer, a pump, a compressor, a generator or a lawn mower.

12. The method of claim 9, wherein the device is an air conditioning unit, a washing machine, a tumble dryer, a washing machine/tumble dryer, a refrigerator, a freezer, a dishwasher, a grinder, a vacuum cleaner, a hairdryer, a pump, a compressor, a generator or a lawn mower.

13. A method according to claim 12, wherein the article is a panel.

14. A composition according to claim 2, wherein the wollastonite has a BET surface area in the range of from about 1.6 to about 3.0 $m^2/g$.

15. A composition according to claim 1, wherein the wollastonite has an aspect ratio in the range of at least 2:1.

16. A composition according to claim 14, wherein the wollastonite has an aspect ratio in the range of at least 2:1.

17. A composition according to claim 1, wherein the wollastonite has a median particle size $d_{50}$ in the range of from about 3 μm to about 85 μm.

18. A composition according to claim 1, wherein the thermoplastic elastomer-wollastonite composite comprises wollastonite in an amount of from about 30 to about 40 weight percent based on the total weight of the thermoplastic elastomer-wollastonite composite.

19. A composition according to claim 1, wherein the thermoplastic elastomer is present in an amount of from about 45 to about 70 weight percent based on the total weight of the composite.

* * * * *